June 4, 1957 — I. GELLER — 2,794,355
LEVER ACTION BUMPER STRAIGHTENER
Filed Nov. 29, 1955
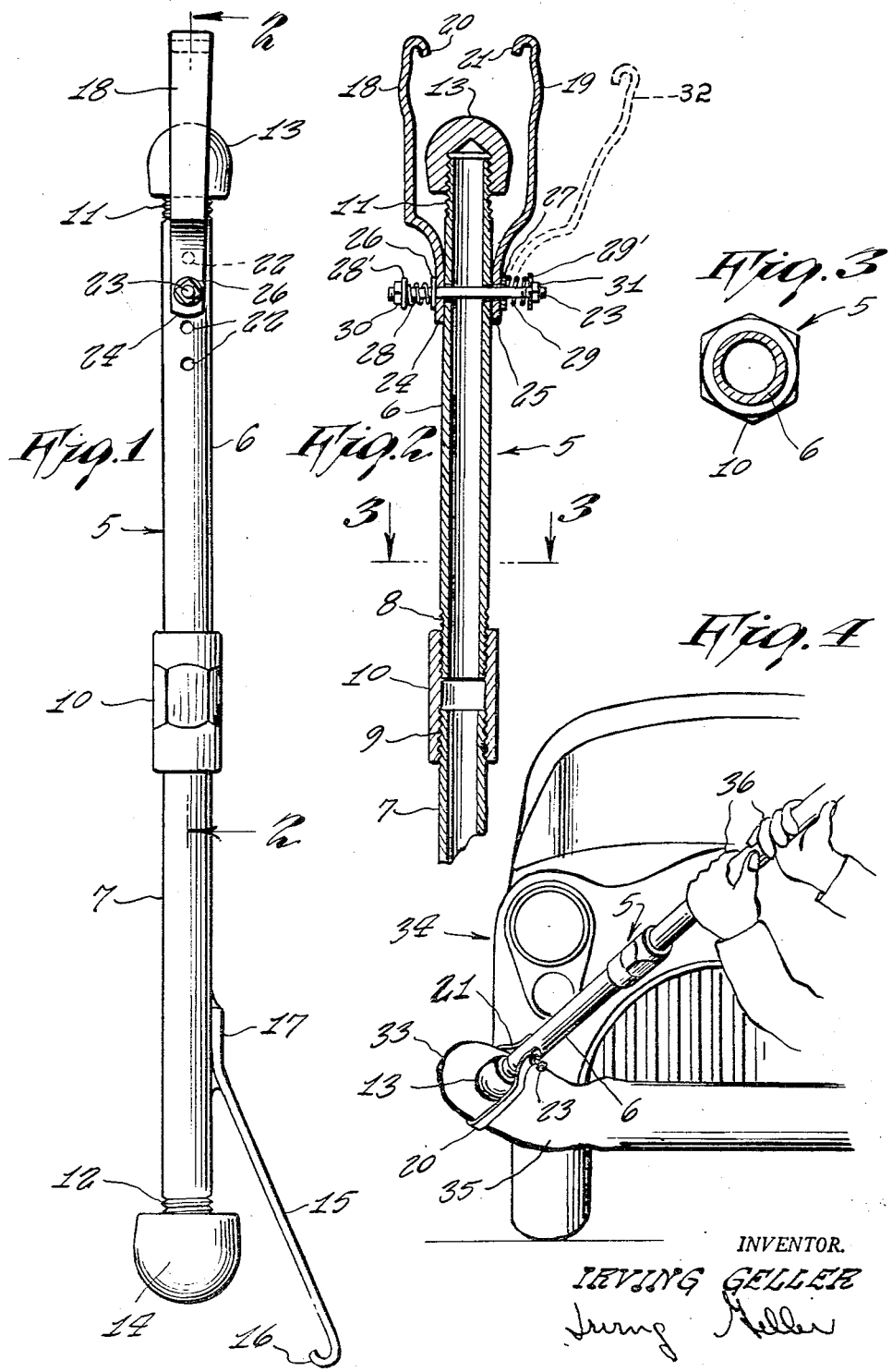
INVENTOR.
IRVING GELLER

United States Patent Office 2,794,355
Patented June 4, 1957

2,794,355

LEVER ACTION BUMPER STRAIGHTENER

Irving Geller, New York, N. Y.

Application November 29, 1955, Serial No. 549,663

1 Claim. (Cl. 81—15)

This invention relates to hand operated tools such as bending bars, levers and straighteners and the like, and particularly to what I choose to term a lever action bumper straightener.

The main object of my invention is to provide a special hand operated lever for restoring bent and twisted automobile bumpers without the necessity of dismantling the bumper and taking it apart.

Another object of my invention is to provide a bumper straightener that is simple in form and sturdy in construction so that it is certain to operate and durable as well.

A further object of this invention is to have a bumper straightener that is relatively light and easy to use, and which is capable of being quickly attached to a bent bumper in effective position for straightening the same by manually pushing, bending or pulling upon the straightener, as the case may be, in order to restore the bumper to original condition and form.

It is also an object of the invention to have such a bumper straightener that is simple to make and as simple to use in order to sell at a reasonable figure and encourage wide distribution on the market.

Other objects and advantages of my invention will appear in further detail as the specification proceeds.

In order to facilitate ready comprehension of this invention for a proper appreciation of the salient features thereof, the invention is illustrated on the accompanying drawing forming part hereof, and in which:

Figure 1 is a side elevation of a lever action bumper straightener made according to my invention and embodying the same in a practical form;

Figure 2 is a vertical longitudinal section of the same tool as taken on line 2—2 in Figure 1;

Figure 3 is a transverse section of the same tool as taken on line 3—3 in Figure 2; and Figure 4 is a fragmentary perspective view of an automobile and bumper showing the invention in actual use.

In these views, the same reference numerals indicate the same parts and features.

All automobile drivers are well aware of the fact that every car is in danger of suffering at least some damage on the highway, and this usually involves a front or rear bumper, if nothing more. It is annoying, of course to find it necessary to hunt up automobile repairmen and face unnecessary costs at their whim, because it would seem reasonable to be able to restore the bumper if only some simple means were available for the purpose. Upon considering this problem, it has occurred to me that a special hand lever tool could well be designed that would be capable of use for straightening a bumper at will, for none has as yet been generally adopted.

As a result of such consideration, I have succeeded in producing an effective lever action bumper straightener along the lines already mentioned, which will now be described in detail in the following.

Hence, in the practice of my invention, a bumper straightener generally indicated at 5 primarily includes two lengths of metal pipe 6 and 7, each having at their adjacent ends threads as at 8 and 9 upon which is releasably screwed an internally threaded coupling 10. The outer ends of the two pipe lengths also have threads 11 and 12, threaded end 11 having a flexible head or cap 13 of rounded ball form screwed upon it, while the other threaded end 12 has a similar but different size of rounded flexible ball-shaped head or cap 14 screwed thereon. The rounded ball-shaped heads 13 and 14 may be made of semihard rubber, flexible plastic of the vinyl series or of built-up material such as leather, or of any suitable material that will not mar or scratch plated metal of which bumpers are made.

Upon the side of pipe member 7 is preferably welded or brazed one end of a long hook member 15 terminating in an inwardly turned hook 16, the other secured end 17 being relatively straight and permanently attached to the pipe 7. Upon the other pipe member 6 are mounted a pair of opposite symmetrical hooks 18, 19 terminating in inwardly directed and mutually facing hook elements 20, 21 extending a short distance beyond the flexible head 13 and spread apart. In this member 6 is a series of transverse holes 22, 22, etc., through one pair of which is fitted a removable bolt or threaded pin 23 that also extends through the inner ends 24, 25 of hook members 18 and 19.

Bolt or pin 23 is threaded at both ends, although one end may have a head and the other end have a thread, if desired, but outside of hook shanks or ends 24 and 25 are mounted washers 26, 27, springs 28, 29, and further washers 28', 29' and finally nuts 30, 31 retaining the washers and springs upon bolt 23 and resiliently holding the hook members 18 and 19 against pipe member 6. These springs allow either hook member 19 or both 18 and 19 to be shifted outwardly as indicated at 32 when setting the tool in place upon a bumper 33 shown on the automobile 34 in Figure 4, when the springs will cause the hook members to snap back into position wherein they catch their hook ends 20 and 21 into engagement with the bumper for straightening the bent or twisted portion 35 thereof. The flexible head 13 is placed against the portion of the bumper beyond the bent portion and the hands 36 applied to the other pipe member 7 forming the other end of the tool and the whole then bent downwardly and outwardly until the bumper is restored to original shape.

In some cases, the other head 14 is applied to the bumper and hook 16 engaged with a portion of the bumper for a longer sweeping bending action, as best judged by experience and observation. In any event, either end of the present tool may be used for straightening bent and twisted bumpers, while the other end serves as the manual lever during operation. When done with, the pipe members may be separated by unscrewing at least one of them for coupling 10 and the parts then stored in the car tool box until again needed.

Manifestly, variations may be resorted to, and parts and features may be modified or used without others within the scope of the appended claim.

Having now fully described my invention, I claim:

A lever action bumper straightener including an elongated manually held element, a flexible head of rounded form upon one end of the element, and a pair of symmetrical, inwardly turned hooked members having shanks attached to the opposite sides of said elongated element, a short distance within the head, and extending outwardly therebeyond, said hook members being adapted to engage a car bumper along opposite edges when the head abuts the exterior surface thereof, said elongated manually held element having a plurality of longitudinally spaced transverse openings, a bolt extending through the selected opening and through the shanks of the symmetrical hook members, and compression springs mounted on the ends of the bolt against these inner ends of said hook members with means on the bolt to retain the springs thereon biased against said inner ends of said symmetrical hook members to hold them in place.

References Cited in the file of this patent

UNITED STATES PATENTS

| | | |
|---|---|---|
| 1,737,084 | Hilstad | Nov. 26, 1929 |
| 2,191,720 | Meinhardt | Feb. 27, 1940 |
| 2,440,536 | Begley | Apr. 27, 1948 |
| 2,616,317 | Hakkerup | Nov. 4, 1952 |